US006282053B1

United States Patent
MacLeod et al.

(10) Patent No.: US 6,282,053 B1
(45) Date of Patent: Aug. 28, 2001

(54) ADHESIVELESS DISC DRIVE SPINDLE ASSEMBLY

(75) Inventors: Donald MacLeod, Santa Cruz; Long Van Nguyen, San Jose; Alireza Rahimi, Los Altos; Robert Nottingham, Santa Cruz, all of CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 08/286,287

(22) Filed: Aug. 5, 1994

(51) Int. Cl.[7] .............................. G11B 17/08; H02K 7/00
(52) U.S. Cl. ...................................... 360/98.07; 310/67 R
(58) Field of Search ............................. 360/97.01–98.01, 360/98.07, 98.08, 99.04, 99.05, 99.08–99.12; 310/67 R, 156, 217, 218, 254, 259

(56) References Cited

U.S. PATENT DOCUMENTS

| | | | |
|---|---|---|---|
| 3,609,722 | * 9/1971 | Zenzefilis | 360/99.12 |
| 3,988,622 | * 10/1976 | Starcevic | 310/91 |
| 4,035,677 | * 7/1977 | Kusayama et al. | 310/42 |
| 4,289,989 | * 9/1981 | Schibline | 310/261 |
| 4,340,830 | * 7/1982 | Hoyer-Ellefser | 310/89 |
| 4,604,665 | * 8/1986 | Müller et al. | 310/67 R |
| 4,656,545 | * 4/1987 | Kakuta | 360/98.07 |
| 4,701,654 | * 10/1987 | Tatukawa et al. | 310/153 |
| 4,816,710 | * 3/1989 | Silvaggio et al. | 310/194 |
| 4,922,406 | * 5/1990 | Schuh | 360/98.07 |
| 4,996,613 | * 2/1991 | Hishida | 360/99.08 |
| 5,045,738 | * 9/1991 | Hishida et al. | 360/98.07 |
| 5,061,868 | * 10/1991 | Iwqzaki et al. | 310/67 R |
| 5,091,809 | 2/1992 | Connors et al. | 360/99.08 |
| 5,126,612 | * 6/1992 | Girault | 310/90.5 |
| 5,155,401 | * 10/1992 | Kanaya et al. | 310/89 |
| 5,173,814 | * 12/1992 | Elsasser et al. | 360/98.07 |
| 5,177,650 | 1/1993 | Jabbari et al. | 360/99.08 |
| 5,200,866 | * 4/1993 | Frugé et al. | 360/99.08 |
| 5,245,234 | * 9/1993 | Okada et al. | 310/57 R |
| 5,267,737 | * 12/1993 | Cossette et al. | 277/80 |
| 5,319,270 | * 6/1994 | Taraka et al. | 310/67 R |
| 5,454,724 | * 10/1995 | Kloeppel et al. | 437/17 |

* cited by examiner

Primary Examiner—Jefferson Evans
(74) Attorney, Agent, or Firm—Kinney & Lange, P.A.

(57) ABSTRACT

A spindle for a disc drive which can be assembled without the use of adhesives is disclosed. Stator electromagnets are encapsulated in a plastic overmold. The stator is clamped to the base with a clamp spring arrangement. An offset between the stator surface and the base flange is covered by a clamp spring such that binding of the clamp spring by a fastener allows for an adjustable biasing force to secure the stator in place. The magnet and flux shield are attached to the rotor sleeve by an easily positioned retaining ring. An elastic foam washer provides a controlled force to secure the magnet and flux shield in place on the rotor. A second elastic foam washer and a shield provide a controlled biasing force to hold magnetic fluid and magnetic poles to the rotor. Bearings are laser welded to the rotor and the shaft to rotatably mount the rotor about the shaft.

34 Claims, 9 Drawing Sheets

ADHESIVELESS DISC DRIVE SPINDLE ASSEMBLY

BACKGROUND OF THE INVENTION

This invention relates to disc drive spindle assemblies, and more particularly, to a disc drive spindle assembly which can be assembled without the use of adhesives.

Computer information is often written to and read from a rotating recording medium. The recording media is generally one or more magnetic discs upon which information is encoded by a transducer. Discs are usually rotated at a relatively high speed and a relatively constant velocity during computer use, rather than repeatedly starting and stopping each time information is transmitted. To achieve this high speed, relatively constant velocity disc rotation, electrically-powered spindle motors are used. The read/write transducer is moved radially with respect to the axis of disc rotation, such that the entire surface of the disc(s) may be accessed.

Spindle motors with separate rotor assemblies and stator assemblies are commonly used for disc drive applications. The rotor generally carries a multipolar magnet, which is adhesively mounted about a lower periphery of the rotor. The stator typically includes a plurality of radially oriented electromagnets, with the polarity of the electromagnets alternated based on the location of the multipolar magnet in the rotor. The multipolar magnet responds to the alternating magnetic field to rotate the rotor and disc(s). While the polarity of the electromagnets in early disc drives was controlled by a brush type contact, the direction of current and polarity of the electromagnets is now generally controlled by back emf within electromagnet coils created by the rotating multipolar magnet. The separateness of the rotor and stator allow a low height profile, and interchangeability of motor sub-assemblies.

In assembly of this separate rotor/stator configuration, the stator is adhesively mounted to a disc drive base plate. Then the rotor assembly is adhesively mounted to ball bearings which are in turn adhesively mounted about a cylindrically-shaped shaft. The shaft is mounted to the base plate such that the multipolar magnet is in proper position relative to the stator. After the spindle motor has been assembled, the disc(s) may be attached to the rotor.

The stator assembly in the spindle motor is one of the contributors to the acoustic noise characteristics generated by the spindle motor. Some of the noise caused by the stator assembly is due to loose magnetic wires in the coils of the stator electromagnets. Wires in the coil tend to move due to the alternating current and alternating magnetic fields encountered. Additionally, exposed metal within the stator could be corrosive. To reduce acoustic noise in the electromagnetic coils and avoid corrosion in the stator, stators are coated with an epoxy adhesive layer.

In addition to the bearing/rotation relationship described above, a magnetic fluid seal is made between the rotor and the shaft. The magnetic field is held as part of a magnetic fluid seal on the rotor, and is retained in contact against the shaft by the magnetic field around the shaft. The magnetic fluid provides a return flow path for magnetic flux between the rotor and the shaft. The magnetic fluid also allows electrical current (known as electro-static discharge, or "ESD") to be readily transmitted between the shaft and the rotor and thus avoid the build up of potentially hazardous voltage differentials. Improper build-up and release of ESD could adversely effect the magnetic recording media. Typically the magnetic fluid seal assembly is held to the rotor through the use of adhesive.

The requirements for the adhesives to hold these various component parts together are particularly demanding and pose a difficult manufacturing and design problem. The adhesive must have considerable structural strength over a wide temperature cycle (up to from −40° C. to +70° C.). The adhesive must retain structural strength over the life of the disc drive. The adhesive used must cure quickly and completely and be easy to dispense, to avoid unnecessary delay during spindle assembly. Additionally, the adhesive must have low outgassing and must be dispensable without contacting improper surfaces, to maintain the necessary cleanliness and performance of the disc drive.

To satisfy all these requirements there are very few adhesives which are practically available. The adhesives available are expensive, and the cost of installation, including process time and tooling, is high. Even when coated with epoxy adhesive, the non-smooth profile of the wire coil tends to attract contaminants such as dust particles, adversely affecting the performance of the disc drive. Accordingly, a spindle assembly is desired which will avoid the costs and problems of adhesives while still allowing proper attachment of the components and minimizing the acoustic and dust collecting problems of the stator assemblies.

SUMMARY OF THE INVENTION

The present invention is an adhesiveness disc drive spindle assembly. The stator assembly is held to the base with a clamp spring arrangement tensioned by screw fasteners. The multipolar magnet on the rotor is attached to the rotor sleeve with a retaining ring biased against a radially extending surface of the rotor. A flux shield is held in place axially between the magnet and the radially extending surface of the rotor, and an elastic foam washer is provided to establish a proper biasing force. A magnetic fluid seal is attached to the rotor by biasing a press fit shield against a lower radially extending surface of the bearings. A second elastic foam washer is provided to establish a proper biasing force. The stator windings are encapsulated in a plastic overmold.

While the above-identified drawing figures set forth alternative embodiments, other embodiments of the present invention are also contemplated, some of which are not noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
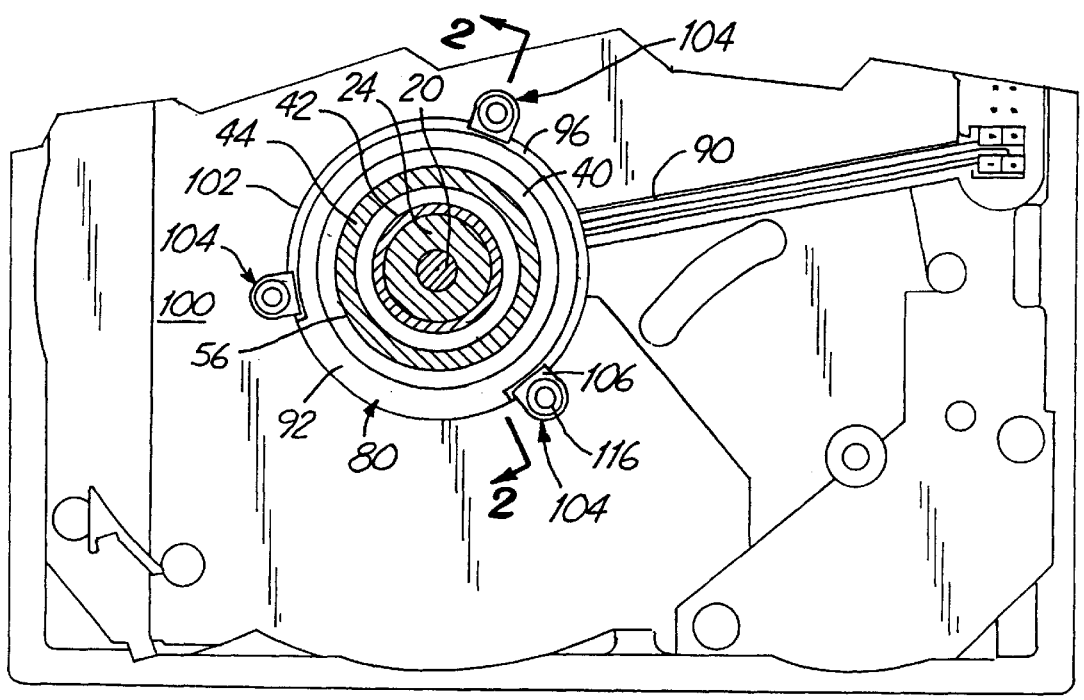
FIG. 1 is a plan view in partial cross-section of a spindle assembly according of the present invention, taken along line 1—1 of FIG. 2.
Figure 2:
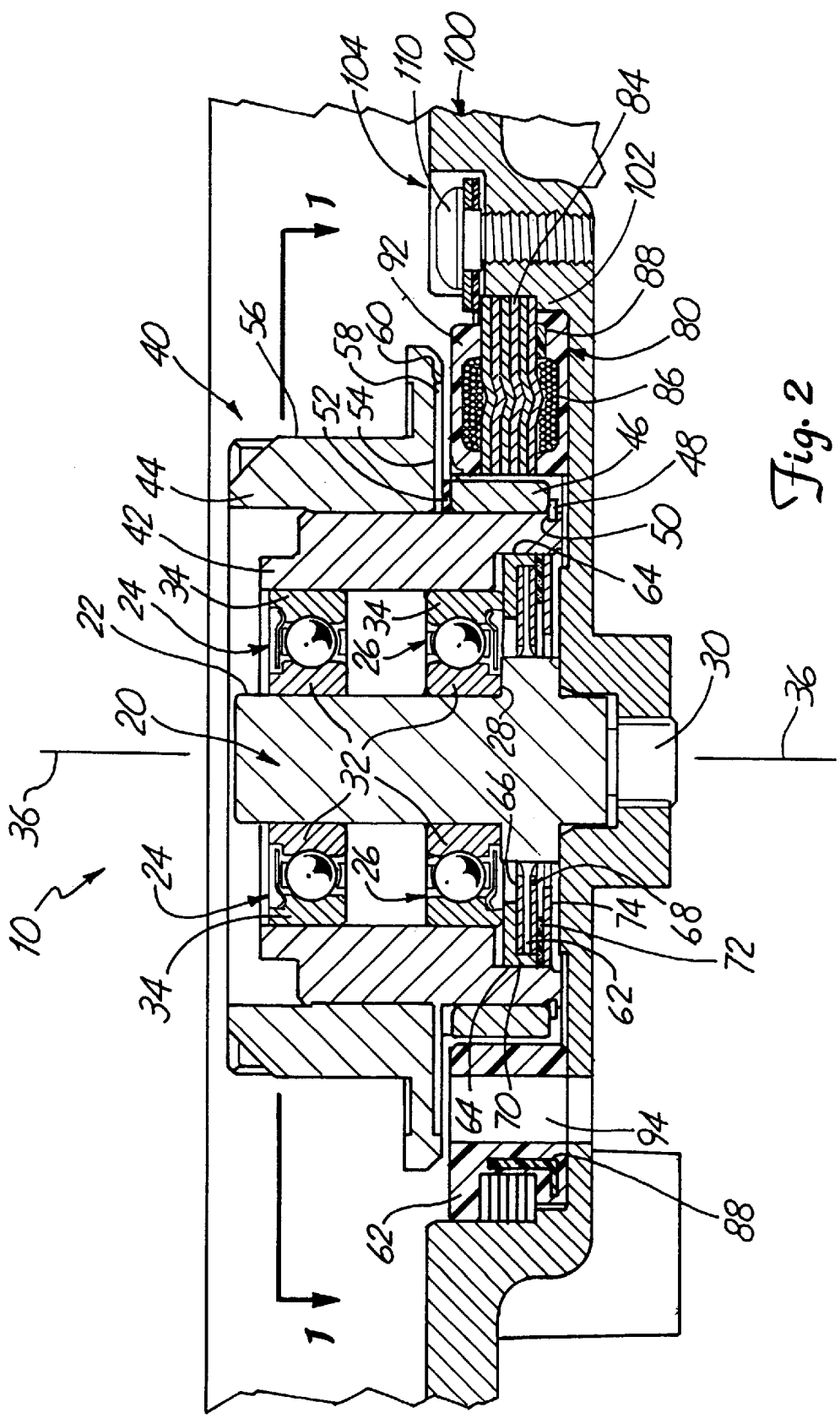
FIG. 2 is an enlarged cross sectional view taken along line 2—2 of FIG. 1.
Figure 3:
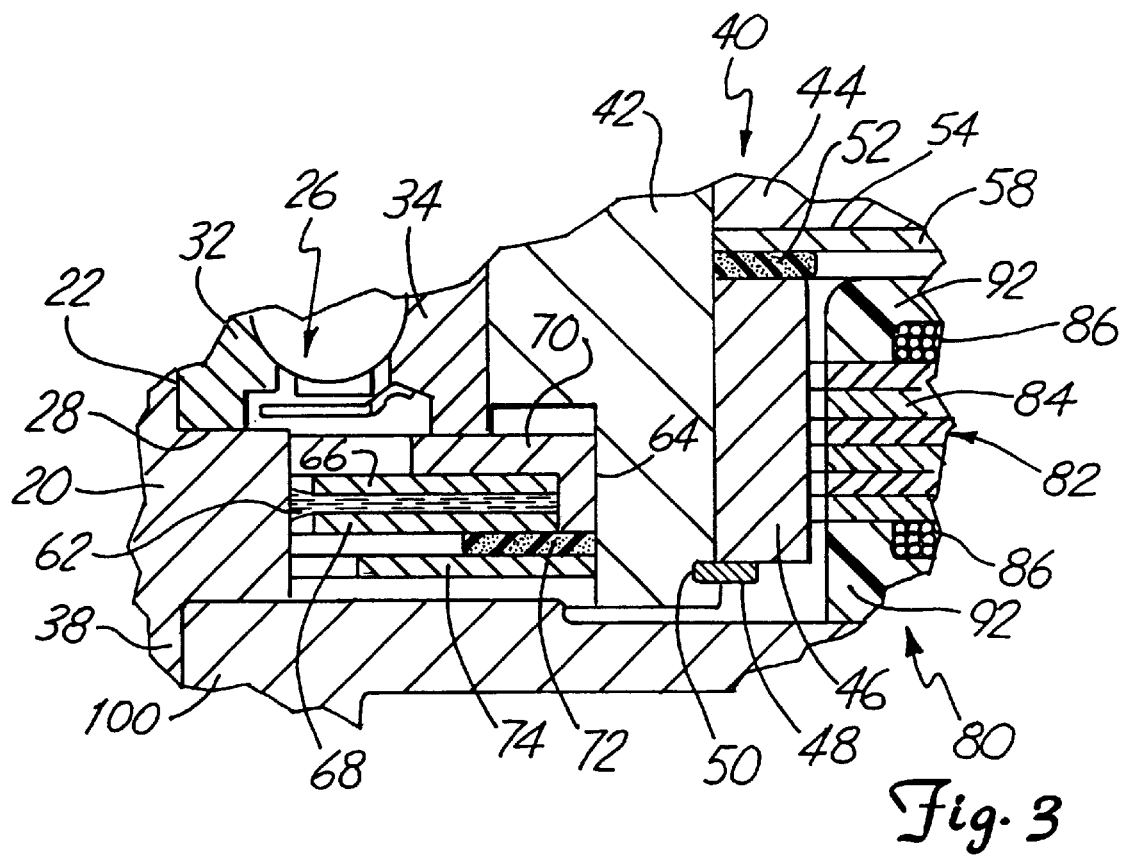
FIG. 3 is a greatly enlarged cross sectional view of the lower central portion of FIG. 2.

As shown in FIGS. 1–3, spindle assembly 10 includes stationary shaft 20 mounted in base 100, rotor 40 rotationally mounted on shaft 20, and stator assembly 80 mounted on base 100. Shaft 20 has a cylindrical section 22 to receive upper and lower ball bearings 24, 26 (shown simplified in FIG. 1). Shoulder 28 is positioned at the bottom of cylindrical section 22 for proper placement of lower bearing 26 on shaft 20. Shaft 20 further has base attachment section 30 which will allow for secure attachment of shaft 20 to base 100 during assembly of the disc drive. To obtain the preferred shaft profile, shaft 20 may be machined out of stainless steel. As shown in FIG. 1, the various components of the spindle assembly 10 are generally annular, although workers skilled in the art will realize that alternative designs which vary significantly from an annular shape may be necessary or desirable.

Upper and lower ball bearings 24, 26 are commonly available and have stainless steel inner and outer races 32, 34. Outer races 34 of ball bearings 24, 26 support rotor 40 for rotation about axis of rotation 36.

Rotor 40 includes sleeve 42 and hub 44. Sleeve 42 is preferably stainless steel and hub 44 is preferably aluminum. Hub 44 is preferably heated and shrink fit over sleeve 42 to securely attach hub 44 and sleeve 42. The lower periphery of sleeve 42 carries magnet 46 which responds to the magnetic field of stator 80, and sleeve 42 acts as a back iron for magnet 46. Magnet 46 is held in radial position because the inner diameter of magnet 46 is sized to fit the outer diameter of sleeve 42. Magnet 46 is held in axial position by placing retaining ring 48 in recess 50 of sleeve 42. Retaining ring 48 biases magnet 46 upwards, pressing against elastic washer 52 and a bottom surface 54 of hub 44.

Peripheral surface 56 of hub 44 is sized to receive one or more discs (not shown) of the disc drive, such as magnetic discs commonly used to record information in a computer. To help insulate the magnetic discs from magnetic fields created by stator 80 and magnet 46, hub 44 has flux shield 58 of magnetic stainless steel positioned along its bottom surface 54. The outer diameter of flux shield 58 fits within outer shoulder 60 of hub 44, holding flux shield 58 in a fixed radial position relative to hub 44. The biasing force of retaining ring 48, through magnet 46 and elastic washer 52, secures flux shield 58 axially against bottom surface 54 of hub 44.

While a preferred rotor 40 is described, workers skilled in the art will recognize that widely varying rotor configurations may be equivalently used for a suitable rotor, based on the particular application, so long as the rotor provides stator assembly 80 is described, workers skilled in the art will recognize that widely varying stator configurations may be equivalently used for a suitable stator, based on the particular application, so long as the stator rotates the rotor.

Retaining ring 48 is preferably stainless steel having a C-clip design with an opening in its periphery. The opening allows the C-clip retaining ring 48 to expand at its opening during assembly, but otherwise presses inward in recess 50 to retain a fixed axial position. Alternatively, retaining ring 48 may be a press fit ring design and recess 50 need not be present. The press fit retaining ring design retains its axial position through friction of the press fit. The flat circular shape makes retaining ring 48 inexpensive and easy to produce. Either the C-clip or the press-fit retaining ring 48 is easy to install with a simple tool. Workers skilled in the art will recognize that many various shapes and sizes of retaining rings will equivalently provide an axial force securing magnet 46.

The thicknesses of magnet 46, elastic washer 52 and flux shield 58, together with the axial location of retaining ring 48 relative to bottom surface 54 are toleranced such that elastic washer 52 is compressed to an appropriate deflection. This provides a controlled axial contact force between magnet 46 and hub surface 54 via flux shield 58, preventing both magnet 46 and flux shield 58 from slipping axially under load conditions. For example, the desired axial force between magnet 46, elastic washer 52 and flux shield 58 to properly prevent slipping may be 10 lbs. Elastic washer 52 may be compression tested to predetermine that 10 lbs. of compression deflects elastic washer 52 from 40 to 60%, or ideally 50% of the its uncompressed thickness. The axial location of retaining ring 48 may then be chosen such that elastic washer 52 is compressed 50%, thus ensuring a proper biasing force.

Elastic washer 52 can potentially be made from any compressible elastic material, but is preferably closed or open cell foam such as PORON open cell foam manufactured by Rogers Corp. of Woodstock, Conn. PORON open cell foam provides good sealing and force transmission between magnet 46 and flux shield 58 and bottom surface 54.

Magnet 46 is preferably polarized into eight separate polarization sectors, each sector occupying about 45° and having opposite polarity as adjacent sectors. Stator assembly 80 preferably includes twelve radially positioned electromagnets 82. Electromagnets 82 include core 84 made of six sheets of laminated iron and wrapped with coil 86 of wire. Any exposed surface of core 84 is sealed with coating 98 to reduce corrosion. Plastic bobbin 88 is shown and is helpful in winding coils 86 about cores 84. Current is provided to coil 86 through flexible printed circuit 90. While electromagnets 82 are usually spaced equidistant from each other and spaced as closely as possible to magnet 46 (to provide a uniformly reversing magnetic field as strong as possible with the least possible current), workers skilled in the art may find other radially spaced electromagnet patterns beneficial, regardless of whether electromagnets 82 are equally spaced from each other or equally spaced from axis of rotation 36. Workers skilled in the art will recognize that many various configurations of magnets and stators will equivalently rotate rotor 40.

Magnetic fluid 62 is positioned on inner cylindrical surface 64 of sleeve 42 (See FIG. 3). Magnetic fluid 62 creates direct magnetic and electrical contact between rotor 40 and shaft 20, to provide a return path for magnetic flux and prevent undesirable electro-static discharge (ESD). Magnetic fluid 62 is retained between upper and lower magnetic poles 66, 68. Magnetic poles 66, 68 have an inner diameter which is slightly larger than the opposing outer diameter of shaft 20, and thus never contact shaft 20. However, the edge of magnetic fluid 62 extends beyond magnetic poles 66, 68 to contact shaft 20 and complete contact. Magnetic fluid 62 is held in place against the opposing outer diameter of shaft 20 by the magnetic field created by magnet 46.

Seal holder 70 positions magnetic poles 66, 68 in the proper radial position. Seal holder 70 has an outer diameter equivalent to the diameter of opposing inner cylindrical surface 64 of sleeve 42. The cross sectional L-shape of seal holder 70 allows proper axially placement of magnetic fluid 62 by butting up against a lower surface of outer race 34 of lower ball bearing 26. Seal holder 70 is preferably of non-magnetic stainless steel. The magnetic fluid seal assembly, including magnetic fluid 62, poles 66, 68, and seal holder 70, is held in place by elastic washer 72 which in turn is held in place by shield 74. Shield 74 has an outer diameter equivalent to the diameter of inner cylindrical surface 64 of sleeve 42 to be secured radially. As with retaining ring 48 described above, shield 74 may be held in place axially either through a C-clip design or by a press fit ring design. As with elastic washer 52 described above, elastic washer 72 is preferably made from PORON open cell foam. The elasticity of washer 72 at a predetermined amount of compression (e.g., 40 to 60% of uncompressed thickness) readily provides a proper axial retaining force between shield 74, magnetic poles 66, 68, magnetic fluid 62, and seal holder 70. Workers skilled in the art will recognize that many various shapes and sizes of shields will equivalently provide an axial force securing the magnetic fluid seal assembly.

Figure 4:
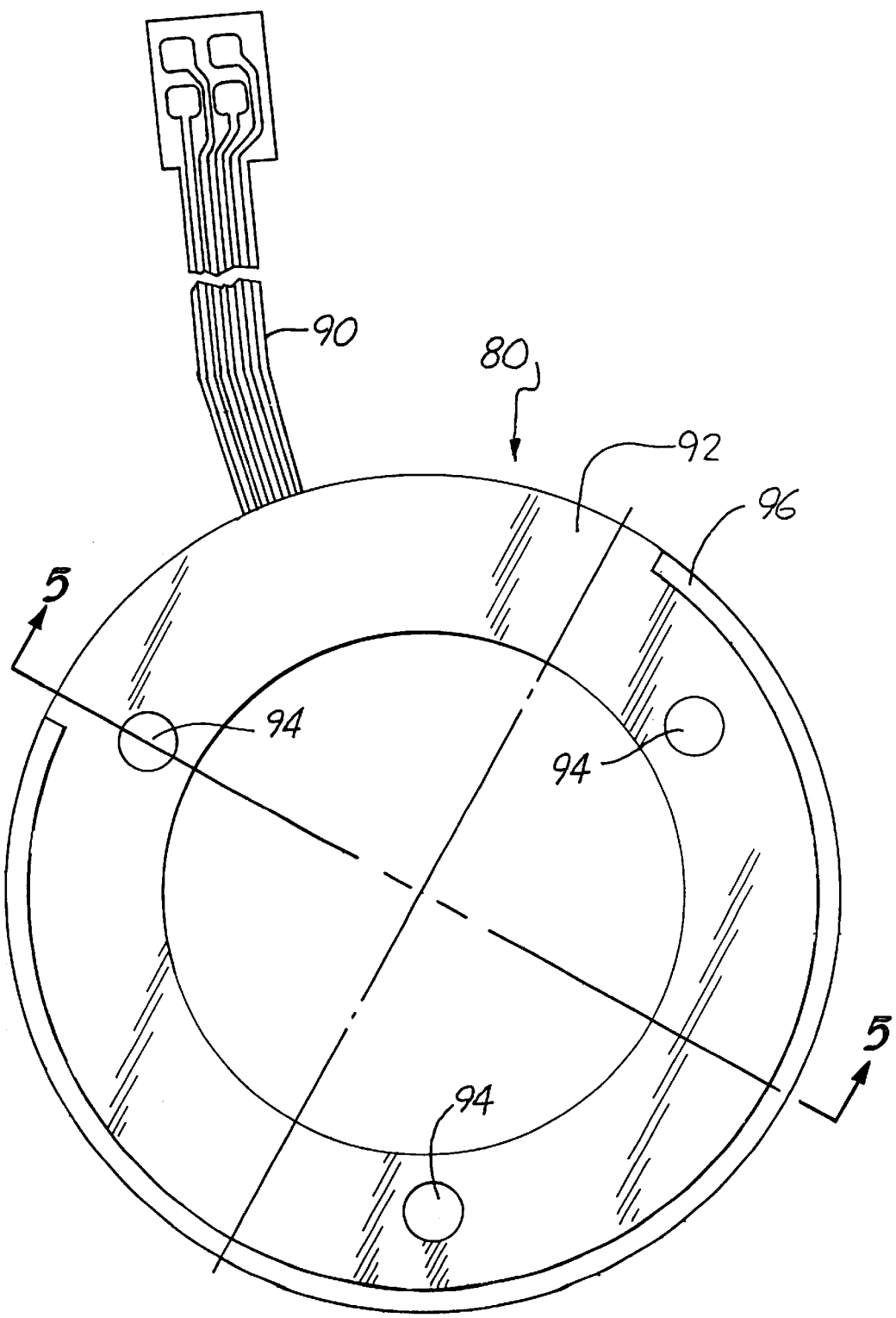
FIG. 4 is a plan view of the overmolded stator assembly of the present invention.
Figure 5:
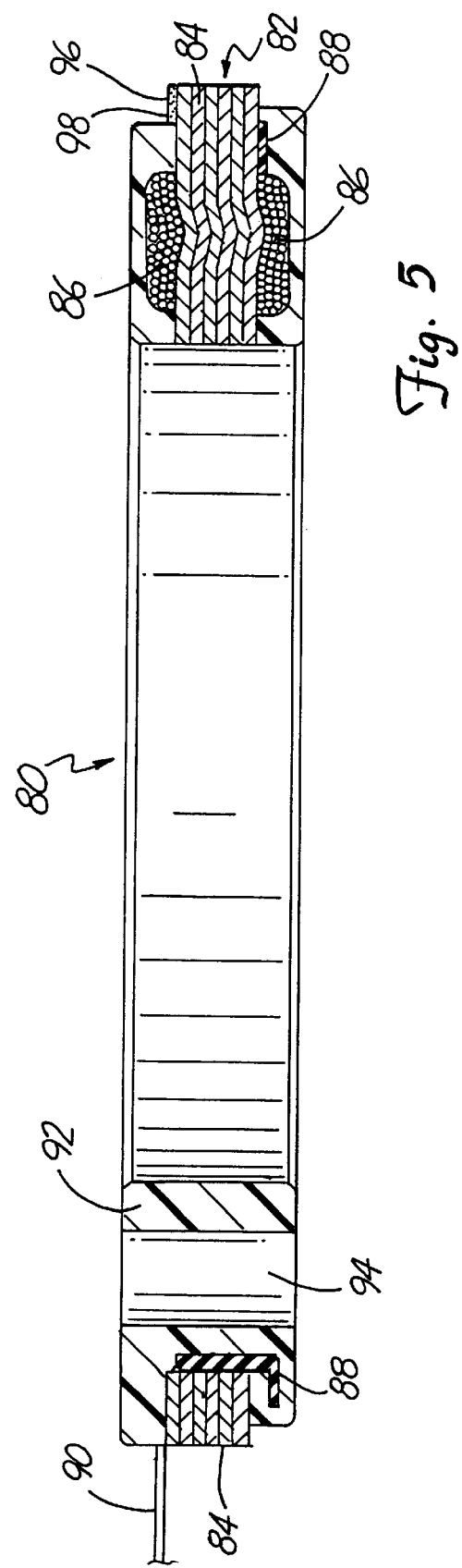
FIG. 5 is a cross sectional view of the overmolded stator assembly taken along line 5—5 of FIG. 4.

As shown in FIGS. 4 and 5, electromagnets 82 are encased in overmold 92, such that electromagnets 82 are hidden by overmold 92 in the plan view of FIG. 4. Overmold 92 is preferably a plastic material such as MINELON II marketed by NMB Corp. of Japan., a bulk molding compound of thermoset molding material based on unsaturated polyester resin and containing inorganic fillers such as calcium carbonate, aluminum trihydrate and chopped short glass fiber. Overmold 92 encloses coil 86 and securely holds the wires in place to prevent movement of coil wires during motor operation, helping to eliminate acoustic noise. Overmold 92 also provides a flat surface along the top of coil 86, helping to reduce dust collection and contamination. Overmold 92 is provided with three fixturing holes 94 which extend through base 100. These fixturing holes 94 facilitate attachment of the disc(s) to hub 44 after spindle assembly is complete. Workers skilled in the art may find other shapes of overmold preferable based on their particularly application. The desired shape of overmold 92 may be provided around electromagnets 82 by injection molding of the plastic within a mold die.

Figure 6:
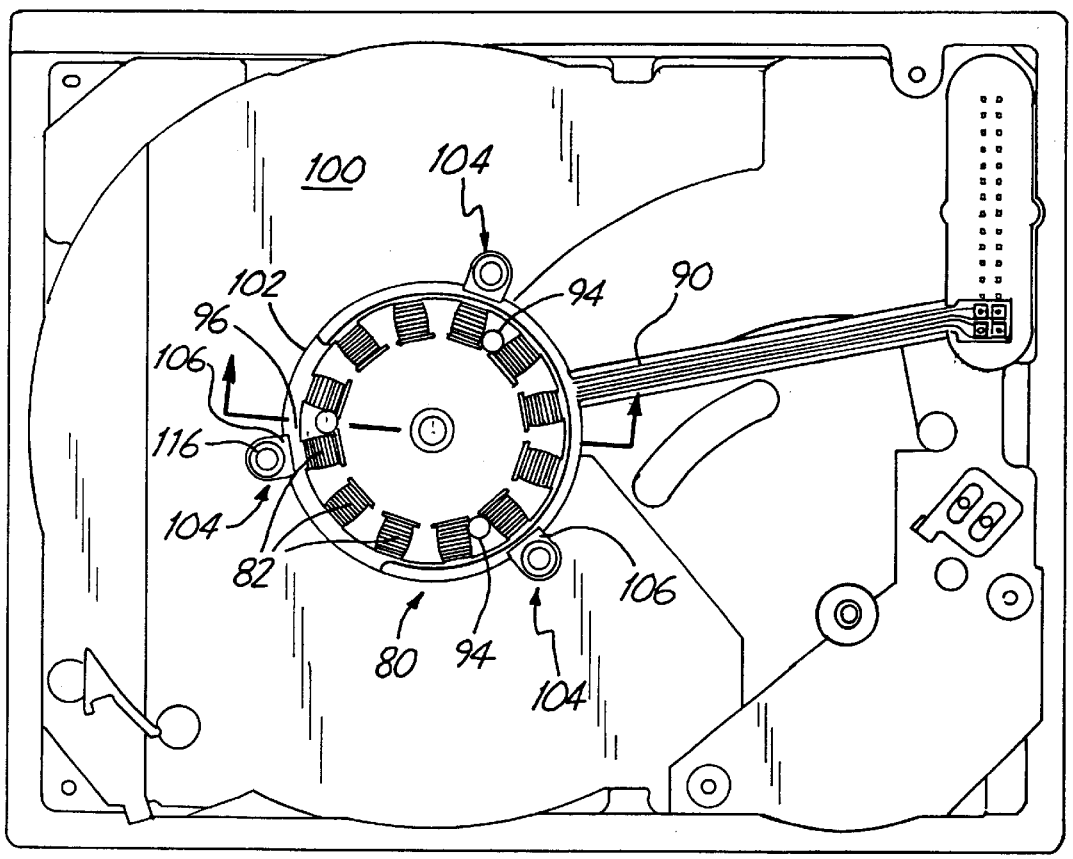
FIG. 6 is a plan view of a disc drive base and stator assembly showing the stator clamping arrangement of the present invention.
Figure 7:
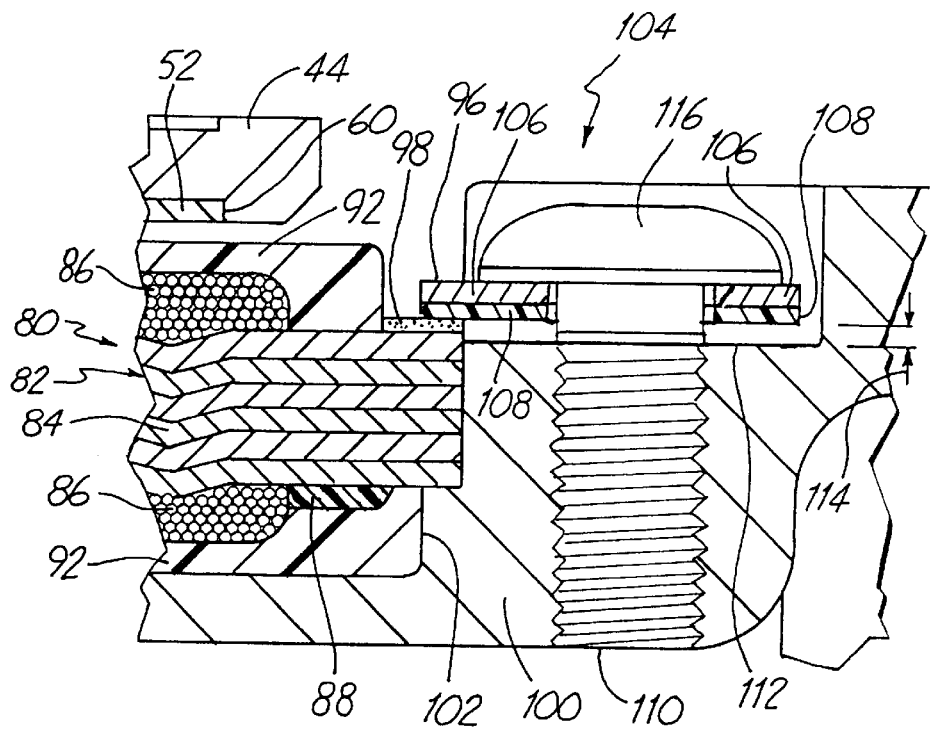
FIG. 7 is an enlarged cross sectional view of the stator clamping mechanism of the present invention.
Figure 8:
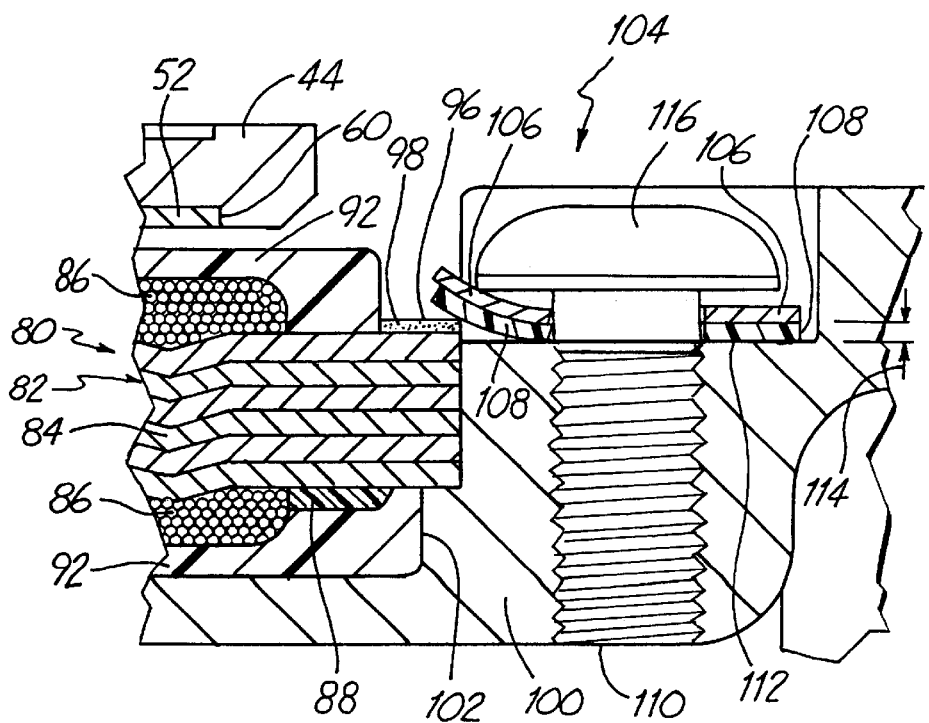
FIG. 8 is an enlarged cross sectional view of the stator clamping mechanism during tensioning of the clamp spring.

As best shown in FIGS. 6–8, stator 80 is retained in stator bed 102 of base 100 by three fastener assemblies 104. Stator bed 102 is shaped to prevent radial movement of stator 80. Fastener assembly 104 includes clamp spring 106, clamp washer 108 and fastener 110, which attaches to flange surface 112 of base 100. Clamp spring 106 is preferably made of flat stainless steel, and during bending acts as a spring. Fastener 110 is preferably a screw threaded fastener to provide ease of upward and downward adjustment. As shown in FIGS. 7 and 8, flange surface 112 is slightly below clamping surface 96 of stator 80, providing an offset 114. Clamping surface 96 may be the surface of coating 98 (as shown), or another surface such as that of core 84, coil 86 or overmold 92. As depicted alternatively in FIGS. 1 and 6, fastener assembly 104 may be used either with or without use of an overmold on stator 80.

The operation of fastener assembly 104 is as follows. As shown in FIG. 7, clamp spring 106 originally has a planar surface which covers offset 114. As fastener 110 is tightened down (FIG. 8), head 116 of fastener 110 begins to bend clamp spring 106 due to offset 114. The clamping force provided by clamp spring 106 on stator surface 96 is dependant on the amount of bending caused by fastener 110, and the amount of clamping force can be easily monitored through the amount of bending of clamp spring 16. Clamp spring 106 is configured such that a designated amount of bending (e.g., preferably an amount between 10 and 30°, such that a slight gap 115 is left between head 116 and the far edge of clamp spring 106 after tightening) will provide a proper securing for stator 80 under load conditions. The function of clamp washer 108 is to prevent any damage to coating 98 or core 84 caused by clamp spring 106 as fastener 110 is tightened down. Accordingly, clamp washer 108 may be made from a soft cloth-like or elastic material, but is preferably plastic or MYLAR.

Figure 9:
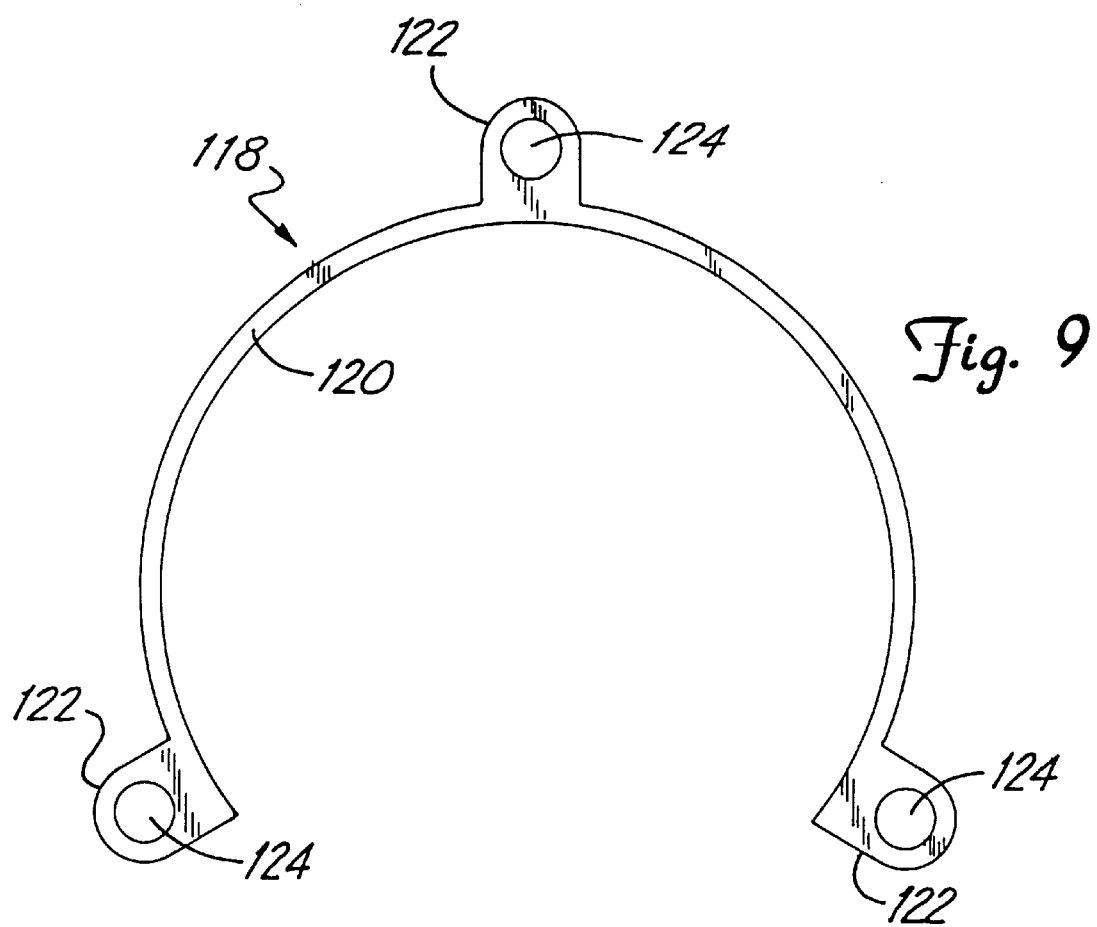
FIG. 9 is a plan view of an alternate embodiment of the clamp spring of the present invention.

FIG. 9 shows a plan view of an alternative clamp spring band 118 for use in fastening stator 80 to base plate 100. Rather than using three separate clamp springs 106, this singular clamp spring band 118 has band 120 which extends approximately 270° around stator 80 and holds together three clamp spring portions 122. The larger C-shaped clamp spring band 118 has three fastener locations 124 and thus can be used identically as three individual clamp springs 106 to clamp stator 80 in place.

Assembly of spindle 10 is preferably be achieved as follows. Stator assembly 80, with any overmold 92, is prepared. Hub 44 is attached to sleeve 42, by heating of aluminum hub 44 to expand around sleeve 42 such that cooling of hub 44 will cause a shrink fit between the inner circumference of hub 44 and the outer circumference of sleeve 42. Lower bearing 26 is attached to shaft 20, and upper bearing 24 is attached to shaft 20. The hub/sleeve assembly of rotor 40 is then slid over outer races 34 of bearings 24, 26 and attached. While bearings 24, 26 may be attached to shaft 20 and rotor 40 in any way known in the art, it is preferred that the corners of races 32, 34 be laser welded to shaft 20 as shown in FIG. 2.

Seal holder 70, upper and lower magnetic poles 66, 68 and magnetic fluid 62 therebetween are positioned on lower diameter 64 of sleeve 42. Elastic washer 72 and shield 74 are then used to maintain the axial position of magnetic fluid 62 and magnetic poles 66, 68.

Flux shield 58, elastic washer 52 and magnet 46 are positioned against lower surface 54 of hub 44 and around the outer circumference of sleeve 42. Flux shield 58, elastic washer 52 and magnet 46 are held in place by retaining ring 48 being placed into recess 50 on sleeve 42.

Stator assembly 80 is placed in stator bed 102 of base 100. Stator 80 is secured from axial movement by tightening of fasteners 110. Deflection of clamp spring 106 controls the axial clamping force placed on stator 80. Then rotor/shaft assembly is attached to base 100 so as to properly position magnet 46 opposing electromagnets 82. Magnetic discs (not shown) are attached to rotor 40 as needed.

Figure 10:
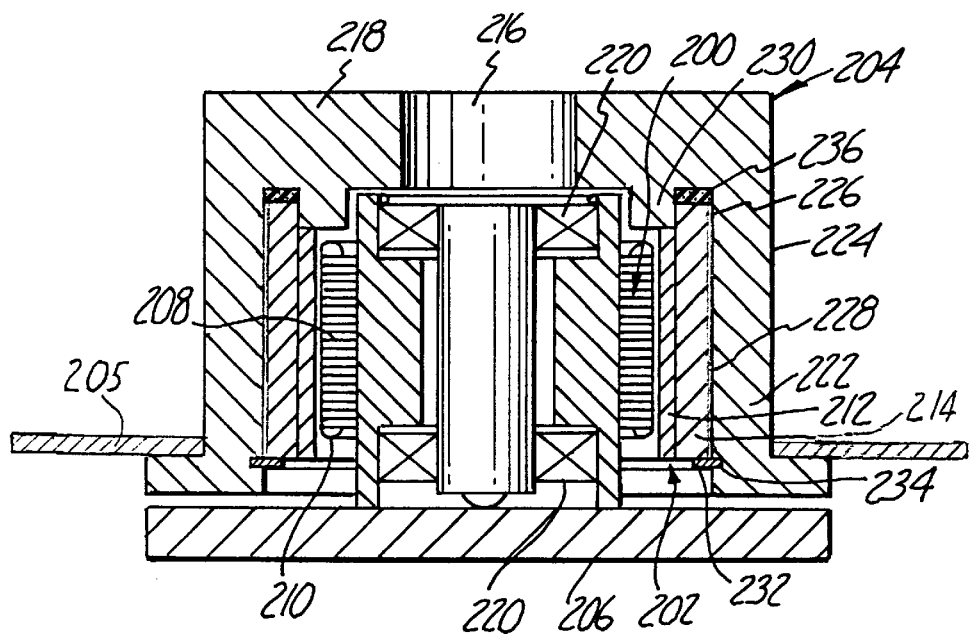
FIG. 10 is a cross-sectional side view of an alternative disc drive configuration incorporating the retaining ring of the present invention.

Workers skilled in the art will appreciate that adhesiveness attachment through retaining ring 48 can be used in numerous other disc drive configurations. For instance, as shown in FIG. 10, the disc drive configuration of U.S. Pat. No. 5,091,809 to Connors et al. can be modified to incorporate the present invention.

In the configuration of FIG. 10, stator 200 magnetically propels rotor 202 and spindle hub 204 rotationally about stator 200. One or more discs 205 may be mounted to the outer surface of spindle hub 204 to be rotated at a rate which facilitates data storage and retrieval in a timely and accurate manner. Stator 200 is fixed to disc drive frame 206. Stator 200 contains active magnetic circuits including laminated core 208 and a plurality of phase windings 210. Rotor 202 consists of a plurality of permanent magnets 212 attached to the inner diameter of sleeve or back iron 214. Back iron 214 has a substantially cylindrical wall portion 214 to whose inner diameter permanent magnets 212 are attached.

Spindle hub 204 is cup shaped with a radially extending end wall portion 218 to which shaft 216 is attached. Shaft 216 is fitted into a hole in end wall portion 218 of spindle hub 204 and is oriented so that shaft 216 extends axially internal to spindle hub 204. Shaft 216 cooperates with a pair of bearings 220 to facilitate smooth rotation of spindle hub 204 about stator 200.

Spindle hub 204 has a storage disc receiving portion 222 which forms the wall of the cup shape. Storage disc receiving portion 222 has substantially cylindrical circumferential inner surface 226 and outer surface 224. Outer surface 224 has a diameter slightly smaller than an inner diameter of a disc such that the storage disc receiving portion 222 extends coaxially through the central opening of a disc or discs 205.

Inner surface 226 has a diameter which is slightly larger than the diameter of the outer surface of back iron 214. Thus, spindle hub 204 easily fits over rotor 202 maintaining a small air gap 228 between inner surface 226 of spindle hub 204 and outer surface of back iron 214. Air gap 228 is maintained so that the thermal expansion and contraction of back iron 214 does not distort disc bearing spindle hub 204 causing disc misalignment or slippage.

As shown, radially extending end wall portion 218 has a shoulder 230 extending slightly downward to radially position back iron 214 and permanent magnets 212. Back iron 214 is held to radially extending end wall 218 by retaining ring 232 which biases itself against recess 234 of inner surface of hub 204. Elastic washer 236 is positioned between the upper surface of back iron 214 and radially extending end wall 218 of hub 204.

Assembly of the disc drive in this configuration involves tensioning retaining ring 232 inward such that it passes through inner surface 226 to recess 234. Retaining ring 232 then is released to press outward into a fixed axial position in recess 234. The axial thicknesses of back iron 214 and elastic washer 236, together with the axial location of retaining ring 232 relative to radial extending portion 218, are toleranced such that elastic washer 236 is compressed to an appropriate deflection. Retaining ring 232 thus presses axially to attach the top surface of back iron 214 to radially extending end wall 218 of hub 204. Workers skilled in the art will appreciate that retaining rings 48, 232 could be similarly used in other configurations.

Workers skilled in the art will appreciate that Connors et al. U.S. Pat. No. 5,091,809 addresses the effects of thermal cycling on the disc by maintaining an air gap between the back iron and the stator hub surface. The means of attaching the back iron to the hub is not central to the Connors invention, which is therefor entitled to a broad range of equivalents with regard to the means of attachment.

In contrast, the means of attachment is central to the present invention. The present invention as disclosed in FIG. 10 achieves the same result as Connors et al., except that in the present invention, the manner of attachment of back iron 214 to spindle hub 204 employs retaining ring 232 and elastic washer 236. The present invention provides an easily assembled unit with accurate repeatability of assembly due to the amount of compression of elastic washer 236. Ease of assembly is important toward controlling production costs, and accurate repeatability is important in producing high quality, high tolerance positioning of product components. The present invention further provides a radially consistent compressive force for axial biasing of back iron 214. A radially consistent compressive force is important in avoiding modes of wear, aging and/or breakage of the attachment mechanism. These functions are neither performed by adhesives, which are difficult to use, have low repeatability and provide a tensile biasing force, nor by screws, which take time to assemble, have repeatability problems and provide a radially inconsistent tensile biasing force. Being central to the present invention, the means of attachment of the present invention is entitled to a range of equivalents which would exclude the screws and adhesives described by Connors et al.

Figure 11:
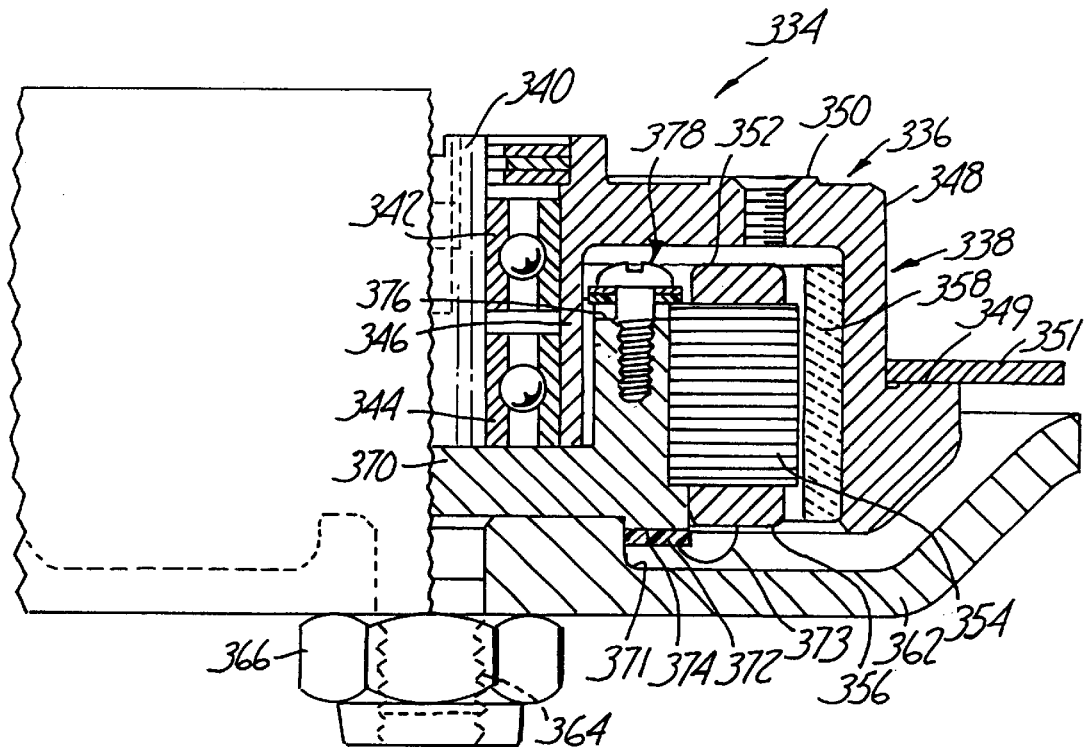
FIG. 11 is a cross-sectional side view of an alternative disc drive configuration incorporating the adhesiveness clamp assembly of the present invention.

In addition to retaining rings 48, 232 being usable in many configurations, adhesiveness clamp assembly 104 can also be used in numerous other disc drive configurations. For instance, as shown in FIG. 11, the disc drive configuration of U.S. Pat. No. 5,177,650 to Jabbari et al. can be modified to incorporate the present invention.

As shown if FIG. 11, an alternative disc drive assembly 334 includes a brushless direct current motor 336 having tub 338 rotatably mounted about stationary shaft 340 by upper and lower bearings 342, 344, with the inner race of bearings 342, 344 mounted to stationary shaft 340 and the outer race of bearings 342, 344 mounted to hub 338. Hub 338 is formed in a generally inverted U-shape in radial cross section and has inner annular arm 346, outer annular arm 348 and top portion 350. Outer annular arm 348 includes shoulder 349 for supporting one or more storage disc(s) 351 in a contaminant-free, combustion-free-environment.

The interior portion of hub 338 operably receives stator 352, including stator lamination stack 354 and stator windings 356. Permanent magnets 358 are mounted on the inner surface of outer annual arm 348 and magnetically interact with stator 338. Disc drive motor 336 is releasably mounted to base member 362 of disc drive assembly 334 by inserting shaft 340 through a centrally located aperture in base member 362. To facilitate securement of motor 336 to base member 362, stationary shaft 340 includes threads 364 at one end for releasable attachment to mating threads in nut 366.

Shaft 340 includes U-shaped section 370. U-shaped section 370 is in turn supported by boss 371 formed in base plate member 362 which serves to maintain disc drive motor 336 in a spaced relation with respect to base member 362. Printed circuit connector 372 is mounted to lower surface 374 of U-shaped section 370 proximate base member 362. Printed circuit connector 372 is electronically connected to stator windings 356 by wire 373 for electrical communication between the stator windings 356 and associated printed circuitry from an external controller.

U-shaped section 370 provides flange surface 376. Fastener assembly 378, substantially identical to fastener assembly 104 shown in FIGS. 7 and 8, attaches to flange surface 376. Flange surface 376 is slightly offset below the surface of stator lamination stack 354, providing the necessary offset for fastener assembly 378. In this configuration the outer surface of U-shaped member 370 provides a stator bed for stator 354, preventing radial movement. Fastener assembly 378 thus mounts stator 354 to stationary shaft 340 and supports stator 352 in a generally fixed position relative to hub 338. Workers skilled in the art will appreciate that fastener assemblies 104, 378 could be similarly used in other configurations.

Workers skilled in the art will appreciate that Jabbari et al. U.S. Pat. No. 5,117,650 addresses the electronic communication for the stator and the risk of contaminant particles escaping from the disc drive motor. The means of mounting and supporting the stator to the stationary shaft is not central to the Jabbari invention, which is thereof entitled to a broad range of equivalents with regard to the means of mounting and supporting.

In contrast, the means of mounting the stator is central to the present invention. The present invention as disclosed in FIG. 11 achieves the same result as Jabbari et al., except that in the present invention, the manner of mounting the stator to the stationary shaft employs fastener assembly 378. Fastener assembly 378 provides an easily assembled unit with accurate repeatability of assembly due to the amount of deflection of the spring clamp. Ease of assembly is important toward controlling production costs, and accurate repeatability is important in producing high quality, high tolerance positioning of product components. The present invention further provides a dependable compressive force for axially holding stator 352 in place. A dependable compressive force is important in avoiding modes of wear, aging and/or failure of the attachment mechanism. These functions are not performed by adhesives, which are difficult to use, have low repeatability and provide an unknown tensile biasing force. Being central to the present invention, the means of mounting the stator of the present invention is entitled to a range of equivalents which would exclude the mount described by Jabbari et al.

Although the present invention has been described with reference to preferred embodiments, workers skilled in the art will recognize that changes may be made in form and detail without departing from the spirit and scope of the invention. For instance, while components of the invention have been described as "upper" or "lower", it is to be understood that the directional orientation of the disc drive and any of the components therein may be altered as needed in a specific application. Similarly, while elements have been described as "inner" or "outer", it is to be understood that these elements may be reversed to better address any specific situation. For instance, the spindle assembly may easily be configured with the stator assembly on the inside of the rotor magnet, with a shaft which rotates, etc. Further changes may be made in form and detail without departing from the spirit and scope of the invention as defined by the following claims. In particular, numerous of the features described herein are unnecessary to practice the invention as claimed, and the claimed invention is not intended to be so limited.

What is claimed is:

1. A spindle motor assembly adapted for rotationally supporting a load about a base, the spindle motor assembly comprising:
    a rotor rotatably mounted on the base, the rotor having an outer periphery capable of supporting the load, the rotor having a radially-extending surface;
    a stator mounted on the base, the stator for providing a magnetic field;
    a magnet opposing the radially-extending surface of the rotor, the magnet supplying a force in response to the magnetic field of the stator for rotating the rotor, and;
    a retaining ring attached to the rotor for biasing the magnet axially, the biasing force securing the magnet axially against the radially extending surface.

2. The spindle motor assembly of claim 1 further comprising:
    an elastic washer about the rotor, wherein the biasing force of the retaining ring at least partially compresses the elastic washer and secures the elastic washer axially against the radially-extending surface.

3. The spindle motor assembly of claim 2, wherein the axial location of the retaining ring compresses the elastic washer a predetermined amount to supply the biasing force.

4. The spindle motor assembly of claim 3, wherein the predetermined amount of compression of the elastic washer is 40 to 60% of an uncompressed thickness.

5. The spindle motor assembly of claim 2, wherein the elastic washer is foam.

6. The spindle motor assembly of claim 1, wherein the magnet is annular with a diameter, wherein the rotor has an opposing annular surface of matching diameter contacting the magnet to secure the magnet form radial movement.

7. The spindle motor assembly of claim 1 in which the rotor comprises:
    a sleeve; and
    a hub shrink fitted about the sleeve.

8. The spindle motor assembly of claim 1 wherein:
    the rotor defines an annular recess, and
    the retaining ring is at least partially disposed in the annular recess.

9. The spindle motor assembly of claim 1 wherein the retaining ring is press fit to the rotor.

10. The spindle motor assembly of claim 1 further comprising:
    a flux shield, wherein the biasing force of the retaining ring secures the flux shield axially against the radially-extending surface.

11. The spindle motor assembly of claim 1 wherein the base further comprises:
    a shaft defining an axis of rotation;
    bearings welded to the shaft and the rotor to rotationally mount the rotor about the shaft.

12. A spindle motor assembly adapted for use in a disc drive for rotationally supporting recording media about a base, the spindle motor assembly comprising:
    a shaft extending perpendicular to the base;
    a rotor rotatably mounted on the shaft, the rotor having an outer periphery capable of supporting recording media, the rotor having a radially-extending surface;
    a magnetic seal assembly opposing the radially-extending surface of the rotor, the magnetic seal assembly providing direct magnetic flux flow and electric flow between the rotor and the shaft; and
    a shield adhesivelessly attached to the rotor for biasing the magnetic seal assembly axially, the biasing force securing the magnetic seal assembly axially against the radially-extending surface.

13. The spindle motor assembly of claim 12 further comprising:
    an elastic washer about the rotor, wherein the biasing force of the shield at least partially compresses the elastic washer and secures the elastic washer axially against the radially extending surface.

14. The spindle motor assembly of claim 13, wherein the amount of compression of the elastic washer is predetermined at 40 to 60% of uncompressed thickness to supply the biasing force.

15. The spindle motor assembly of claim 13, wherein the elastic washer is foam.

16. The spindle motor assembly of claim 12, wherein the radially extending surface is provided by a race of a bearing.

17. The spindle motor assembly of claim 12, wherein the shield is attached to the rotor by a press fit.

18. A disc drive comprising:
   a base having a clamping flange;
   a stator positioned against the base, the stator for providing a magnetic field, the stator having a clamping surface offset from the clamping flange;
   a rotor rotatably mounted on the base, the rotor carrying recording media and rotating in response to the magnetic field provided by the stator; and
   a clamp assembly for biasing the stator against the base, the clamp assembly comprising:
      a fastener fastened to the clamping flange adjacent to the clamping surface of the stator, the fastener having a head;
      a spring clamp opposing the clamping surface and the clamping flange and extending across the offset, the fastener head tensioning the spring clamp across the offset and against the clamping surface to secure the stator against the base.

19. The disc drive of claim 18 wherein the clamp assembly further comprises:
   a plastic washer positioned between the spring clamp and the clamping surface.

20. The disc drive of claim 18 wherein:
   the base defines a stator bed, and
   the stator is positioned in the stator bed such that the base secures the stator from radial movement and from axial movement in one direction.

21. The disc drive of claim 18 wherein:
   the spring clamp bends under the tensioning force provided by the fastener head, and
   bending of the spring clamp of 10 to 30° supplies a securing force.

22. The disc drive of claim 18 comprising multiple, radially positioned clamp assemblies, wherein the spring clamps of the multiple, radially positioned clamp assemblies are provided by a single spring clamp band.

23. The disc drive of claim 18 wherein the clamp assembly bases the stator axially against the base.

24. A method of assembling a spindle motor assembly adapted for use in a disc drive, the method comprising:
   mounting a stator on a base;
   placing a magnet about a radially-extending surface of a rotor;
   attaching a retaining ring to the rotor such that the retaining ring secures the magnet against the radially-extending surface of the rotor; and
   rotatably mounting the rotor on the base.

25. The method of claim 24, wherein the step of mounting the stator comprises:
   placing a stator in a stator bed of the base such that the stator is secured from radial movement and from axial movement in one direction by the stator bed;
   clamping the stator within the stator bed to completely secure the stator from axial movement.

26. The method of claim 25, wherein the step of clamping the stator comprises:
   tensioning a fastener against a spring clamp; and
   monitoring an angle of bend of the spring clamp to determine when the fastener has been tensioned to provide a securing force for the stator.

27. The method of claim 24, further comprising:
   compressing an elastic washer a predetermined amount to supply the securing force for the magnet.

28. The method of claim 24, further comprising:
   placing a flux shield about the radially-extending surface of the rotor,
   wherein the retaining ring is attached to the rotor such that the retaining ring secures the magnet and the flux shield against the radially-extending surface of the rotor.

29. The method of claim 24, further comprising:
   placing a magnetic seal assembly about a second radially extending surface of the rotor; and
   adhesivelessly attaching a shield to the rotor such that the shield secures the magnetic seal assembly against the second radially extending surface of the rotor,
   wherein the rotor is rotatably mounted to the base so as to provide direct magnetic flux flow and electric flow through the magnetic seal assembly between the rotor and the base.

30. The method of claim 29, further comprising:
   compressing an elastic washer a predetermined amount to supply the securing force for the magnetic seal assembly.

31. The method of claim 24, further comprising:
   shrink fitting a hub about a sleeve to form the rotor.

32. The method of claim 24, wherein the base comprises a shaft, and wherein the step of rotatably mounting the rotor comprises:
   welding bearings to the shaft and to the rotor.

33. A disc drive comprising:
   a disc drive frame;
   a shaft extending along an axis;
   a bearing system located around said shaft;
   a spindle hub having an end wall portion and a disc receiving portion, said end wall portion being attached to a rotatable surface and extending radially outward from said rotatable surface, said disc receiving portion extending down from said radially extending end wall portion and having an inner and an outer circumferential surface, said inner and outer circumferential surfaces extending along said axis, whereby said spindle hub rotates about said axis and said shaft extends internal to said spindle hub along said axis;
   at least one storage disc mounted on said downwardly extending disc receiving portion of said spindle hub;
   a back iron having a top and a bottom surface and an inner and an outer circumferential surface, said inner and outer circumferential surfaces extending along said axis, said top surface of said back iron being attached to said radially extending end wall portion of said spindle hub, whereby said outer circumferential surface of said back iron and said inner circumferential surface of said downwardly extending disc receiving portion having overlapping sections;
   a small air gap extending along said axis between substantially all of said overlapping sections of said outer circumferential surface of said back iron and said inner circumferential surface of said downwardly extending disc receiving portion, whereby said small air gap is maintained so that thermal expansion and contraction of said back iron does not distort said downwardly extending disc receiving portion and cause misalignment or slippage of said at least one storage disc;
   a rotor comprising a plurality of permanent magnets attached to said inner circumferential surface of said back iron;

a stator comprising a laminate core and a plurality of phase windings, said stator being fixed to said disc drive frame, whereby said rotor rotates around said fixed stator; and means for attaching said top surface of said back iron to said radially extending end wall portion of said spindle hub.

34. A disc drive assembly for receiving at least one storage disc in a contaminant-free environment, said disc drive assembly comprising:

a brushless drive motor having a stationary shaft and a hub mounted about said stationary shaft, said hub including an interior space for receiving a stator therein, said stator having winding means and magnetically active parts including a stator stack lamination for magnetic interaction with a permanent magnet mounted on an inner surface of said hub, said brushless drive motor further including means for mounting said stator to said stationary shaft and for supporting said stator in a generally fixed position relative to said hub, said hub rotatably mounted to said stationary shaft by upper and lower bearing means, each of said upper and lower bearing means having an inner race mounted to said stationary shaft and an outer race mounted to said hub, said hub having a shoulder means for supporting said at least one storage disc in said contaminant-free environment; and a disc drive base member for mounting said brushless drive motor thereon, said disc drive base member including a boss for receiving an end of said stationary shaft of said brushless drive motor, said stationary shaft including threaded connecting means for releasably securing said stationary shaft to said disc drive base member through an aperture in said boss, said boss cooperating with a lower surface of said stator mounting and supporting means for maintaining said stator of said brushless drive motor in spaced relation with respect to said disc drive base member so that a printed circuit connector may be disposed between said stator and said disc drive base member proximate said winding means for permitting electronic communication between said winding means and the associated printed circuitry from an external controller.

* * * * *

UNITED STATES PATENT AND TRADEMARK OFFICE
CERTIFICATE OF CORRECTION

PATENT NO. : 6,282,053 B1
DATED : August 28, 2001
INVENTOR(S) : Donald MacLeod et al.

It is certified that error appears in the above-identified patent and that said Letters Patent is hereby corrected as shown below:

Title page,
ABSTRACT,
Line 6, delete "binding", insert -- bending --

Column 1,
Line 57, delete "field", insert -- fluid --

Column 2,
Line 28, delete "adhesiveness", insert -- adhesiveless --
Line 56, after "base and", insert -- a --

Column 3,
Line 2, delete "adhesiveness", insert -- adhesiveless --
Line 64, after "provides", insert -- rotational support for the recording media. Similarly while a preferred --

Column 6,
Line 6, delete "16", insert -- 106 --
Lines 56-57, delete "adhesiveness", insert -- adhesiveless --

Column 7,
Line 53, delete "disc", insert -- discs --

Column 8,
Line 17, delete "adhesiveness", insert -- adhesiveless --
Line 23, delete "tub", insert -- hub --
Line 61, delete "354", insert -- 352 --
Line 62, delete "354", insert -- 352 --

Column 10,
Line 18, delete "form", insert -- from --

UNITED STATES PATENT AND TRADEMARK OFFICE
CERTIFICATE OF CORRECTION

PATENT NO. : 6,282,053 B1
DATED : August 28, 2001
INVENTOR(S) : Donald MacLeod et al.

It is certified that error appears in the above-identified patent and that said Letters Patent is hereby corrected as shown below:

Column 11,
Line 42, delete "bases", insert -- biases --

Signed and Sealed this

Twenty-first Day of May, 2002

Attest:

*Attesting Officer*

JAMES E. ROGAN
*Director of the United States Patent and Trademark Office*